United States Patent
Teraguchi

(10) Patent No.: US 10,066,957 B2
(45) Date of Patent: *Sep. 4, 2018

(54) ROUTE GUIDANCE USING TEXT

(71) Applicant: International Business Machines Corporation, Armonk, NY (US)

(72) Inventor: Masayoshi Teraguchi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,884

(22) Filed: Jun. 23, 2015

(65) Prior Publication Data

US 2015/0338231 A1 Nov. 26, 2015

Related U.S. Application Data

(63) Continuation of application No. 14/708,909, filed on May 11, 2015, now Pat. No. 9,921,075.

(30) Foreign Application Priority Data

May 24, 2014 (JP) ................................. 2014-107621

(51) Int. Cl.
G01C 21/36 (2006.01)
G01C 21/34 (2006.01)

(52) U.S. Cl.
CPC ..... G01C 21/3626 (2013.01); G01C 21/3407 (2013.01); G01C 21/3453 (2013.01); G01C 21/362 (2013.01); G01C 21/3611 (2013.01)

(58) Field of Classification Search
CPC ............ G01C 21/3611; G01C 21/3617; G01C 21/3626; G01C 21/3629; G01C 21/3641
See application file for complete search history.

(56) References Cited

U.S. PATENT DOCUMENTS 6,662,105 B1 * 12/2003 Tada ..................... G01C 21/34
340/990
7,333,889 B2 * 2/2008 Hashizume ........ G01C 21/3641
340/995.13

(Continued)

FOREIGN PATENT DOCUMENTS

JP 2003004472 A * 1/2003
JP 2003004474 A 1/2003

(Continued)

OTHER PUBLICATIONS

List of IBM or Patents or Patent applications Treated as Related; JP920140043US2; Date Filed: Jun. 23, 2015, pp. 1-2.

(Continued)

Primary Examiner — Thomas G Black
Assistant Examiner — Ce Li Li
(74) Attorney, Agent, or Firm — Cantor Colburn LLP

(57) ABSTRACT

A computer implemented method for performing route guidance using text includes obtaining an optimal route that connects a start point and an end point of a route input by a user; comparing a route history stored in a memory with the optimal route and extracting a route portion from the optimal route, the route portion being replaceable by a route portion in the route history; creating route guidance for the route portion extracted from the optimal route by using a text indication known to the user, the known text indication specifying the replaceable route portion in the route history; and creating route guidance for a route portion in the optimal route, the route portion being not replaceable by a route portion in the route history, by using a new text indication that specifies the route portion that is not replaceable.

8 Claims, 3 Drawing Sheets

(56) References Cited

U.S. PATENT DOCUMENTS

| | | | | |
|---|---|---|---|---|
| 2003/0028314 A1* | 2/2003 | Nagamune | ............ | G01C 21/26 |
| | | | | 701/431 |
| 2003/0028322 A1* | 2/2003 | Ogawa | ............... | G01C 21/3484 |
| | | | | 701/469 |
| 2005/0107993 A1* | 5/2005 | Cuthbert | ................ | G01C 21/20 |
| | | | | 703/2 |
| 2006/0069500 A1* | 3/2006 | Hashizume | ...... | G08G 1/096827 |
| | | | | 701/410 |
| 2010/0204917 A1* | 8/2010 | Tanabe | ................ | G09B 29/106 |
| | | | | 701/533 |
| 2014/0005924 A1* | 1/2014 | Letz | ..................... | G01C 21/343 |
| | | | | 701/424 |
| 2014/0100780 A1* | 4/2014 | Caine | ..................... | G01C 21/32 |
| | | | | 701/533 |

FOREIGN PATENT DOCUMENTS

| | | | | | |
|---|---|---|---|---|---|
| JP | | 2003042789 A | | 2/2003 | |
| JP | | 2005004138 A | * | 1/2005 | |
| JP | | 2007192601 A | | 8/2007 | |
| WO | WO 2010040385 A1 | * | 4/2010 | ......... G01C 21/3415 |

OTHER PUBLICATIONS

Masayoshi Teraguchi, "Route Guidance Using Text," U.S. Appl. No. 14/708,909, filed May 11, 2015.

\* cited by examiner

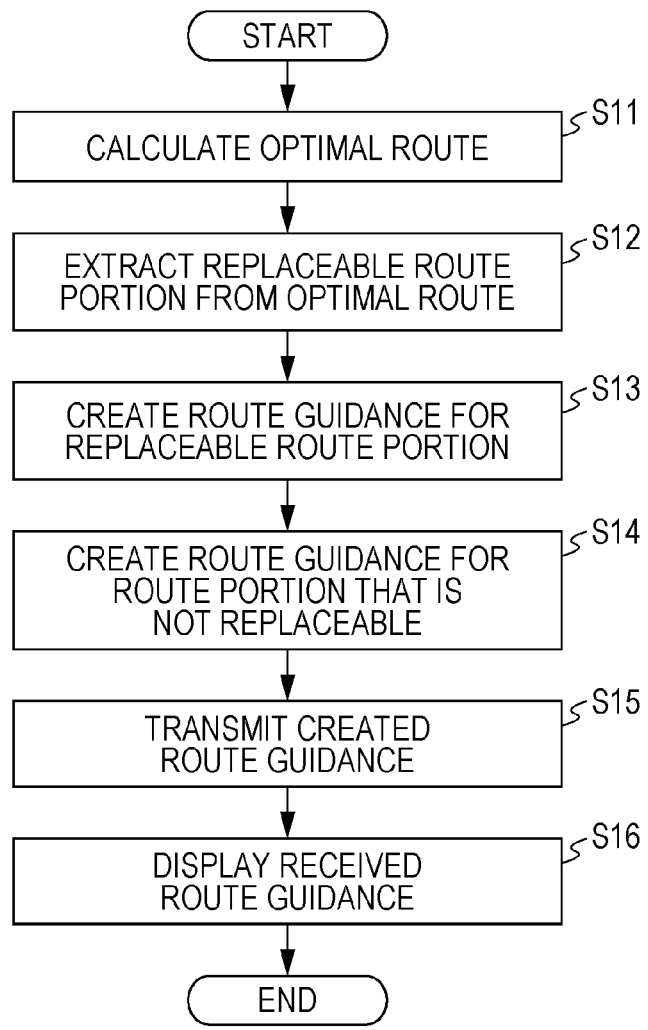
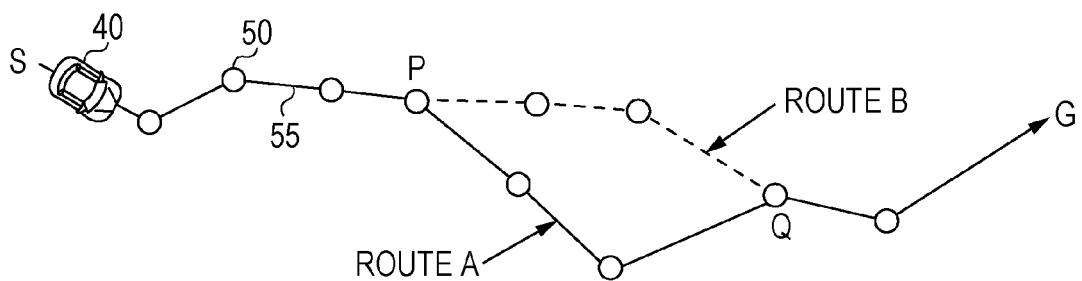

ROUTE GUIDANCE USING TEXT

DOMESTIC AND FOREIGN PRIORITY

This application is a continuation of U.S. patent application Ser. No. 14/708,909, filed May 11, 2015, which claims priority to Japanese Patent Application No. 2014-107621, filed May 24, 2014, and all the benefits accruing therefrom under 35 U.S.C. § 119, the contents of which in its entirety are herein incorporated by reference.

BACKGROUND

The present invention relates to route guidance, and more specifically, relates to a method performed by a computer for route guidance using text.

In emerging countries, for example, countries in Africa, terminals called feature phones or basic phones, which provide mainly telephone call functions, are still the dominant type of mobile phone, and communication of information is actively performed using short message services (SMS). In such environments, text-based route guidance using SMS to communicate a small amount of information needs to be assumed even in the case of providing route guidance for vehicles and the like. Such route guidance has been provided on a trial basis in some countries.

However, an amount of information that can be transmitted with one SMS message is limited to about 120 characters, and about 10 SMS messages are needed to transmit information about an entire route. Therefore, in the results of trials performed so far, participants have currently given feedbacks and made complaints, such as "routes shown are too long".

As a solution to the above issue, an idea may be considered of further summarizing the content and transmitting route guidance. However, route guidance itself is conveyed by text that is already simplified, and therefore, an existing technique for text summarization cannot be successfully (effectively) applied. In the case of SMS, a user (on the receiving side) cannot refer to a history, and therefore, a general cache technique for saving graphs (data structures) is not applicable.

SUMMARY

In one embodiment, a computer implemented method for performing route guidance using text includes obtaining an optimal route that connects a start point and an end point of a route input by a user; comparing a route history stored in a memory with the optimal route and extracting a route portion from the optimal route, the route portion being replaceable by a route portion in the route history; creating route guidance for the route portion extracted from the optimal route by using a text indication known to the user, the known text indication specifying the replaceable route portion in the route history; and creating route guidance for a route portion in the optimal route, the route portion being not replaceable by a route portion in the route history, by using a new text indication that specifies the route portion that is not replaceable.

In another embodiment, a system for performing route guidance using text includes a processing device configured t obtain an optimal route that connects a start point and an end point of a route input by a user; compare a route history stored in a memory with the optimal route and extract a route portion from the optimal route, the route portion being replaceable by a route portion in the route history; create route guidance for the route portion extracted from the optimal route by using a text indication known to the user, the known text indication specifying the replaceable route portion in the route history; and create route guidance for a route portion in the optimal route, the route portion being not replaceable by a route portion in the route history, by using a new text indication that specifies the route portion that is not replaceable.

In another embodiment, a computer readable storage medium having computer readable instructions stored thereon that, when executed by a computer, implements a method for performing route guidance using text. The method includes obtaining an optimal route that connects a start point and an end point of a route input by a user; comparing a route history stored in a memory with the optimal route and extracting a route portion from the optimal route, the route portion being replaceable by a route portion in the route history; creating route guidance for the route portion extracted from the optimal route by using a text indication known to the user, the known text indication specifying the replaceable route portion in the route history; and creating route guidance for a route portion in the optimal route, the route portion being not replaceable by a route portion in the route history, by using a new text indication that specifies the route portion that is not replaceable.

BRIEF DESCRIPTION OF THE DRAWINGS

FIG. 3 is a flowchart that illustrates a method for performing route guidance using text, in accordance with an embodiment of the present invention.

FIG. 4 is a diagram illustrating routes in an exemplary embodiment to which the present invention is applied.

DETAILED DESCRIPTION

Embodiments of the present invention provide a method capable of reducing the amount of information to be transmitted without decreasing the amount of information that is desired to be communicated to users when route guidance using text is to be transmitted.

In particular, embodiments of the present invention provide a computer implement method for performing route guidance using text. The method includes obtaining an optimal route that connects a start point and an end point of a route input by a user, comparing a route history stored in a memory with the optimal route and extracting a route portion from the optimal route, the route portion being replaceable by a route portion in the route history, creating route guidance for the route portion extracted from the optimal route by using a text indication known to the user, the known text indication specifying the replaceable route portion in the route history, and creating route guidance for a route portion in the optimal route, the route portion being not replaceable by a route portion in the route history, by using a new text indication that specifies the route portion that is not replaceable.

According to one aspect of the present invention, the optimal route and the route history are each obtained as a graph that includes a plurality of nodes and edges between two adjacent nodes. A route portion in the route history and a route portion in the optimal route each include the nodes and the edges that form part of the graph.

According to one aspect of the present invention, the known text indication and the new text indication are created for each of at least one edge that forms part of the graph, or are created as one text indication that corresponds to a plurality of successive edges that form part of the graph.

According to one aspect of the present invention, extracting a replaceable route portion from the optimal route includes a step of extracting corresponding route portions from among a plurality of route portions in the route history in descending order of the number of past extractions.

According to one aspect of the present invention, extracting a replaceable route portion from the optimal route includes extracting a route portion from the optimal route, the route portion overlapping a route portion in the route history.

According to one aspect of the present invention, creating route guidance using a text indication known to the user, the known text indication specifying the replaceable route portion in the route history, includes creating route guidance so as to enable the user to uniquely recognize the route portion specified by the known text indication.

According to one aspect of the present invention, the method further includes transmitting the route guidance created by using the known text indication and the new text indication to a terminal operable by the user, and displaying, on a display screen of the terminal, the route guidance that has been received.

Figure 1:
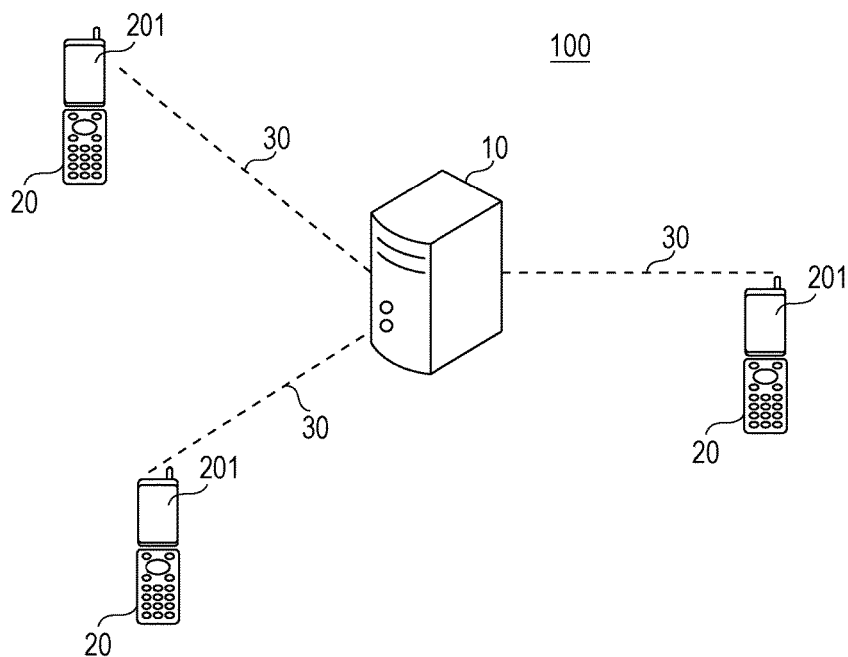
FIG. 1 is a block diagram illustrating an example of a basic configuration of a network system suitable for implementing embodiments of the invention.

An embodiment of the present invention will be described with reference to the drawings. FIG. 1 is a block diagram illustrating an example of a basic configuration of a network system to which a method of the present invention is applied. A network system 100 includes a server 10 and terminals 20 connected to the server 10 via networks (communication paths) 30 so as to enable communication. Examples of the terminal 20 include mobile phones called feature phones or basic phones, and smartphones. The terminal 20 may be a terminal installed in a form of transportation, such as a vehicle. The terminal 20 includes a display screen (display) 201 for displaying route guidance of the present invention. Note that, in FIG. 1, only three terminals 20 are illustrated, however, needless to say, a plurality of terminals of any number which can perform communication may be included.

Figure 2:
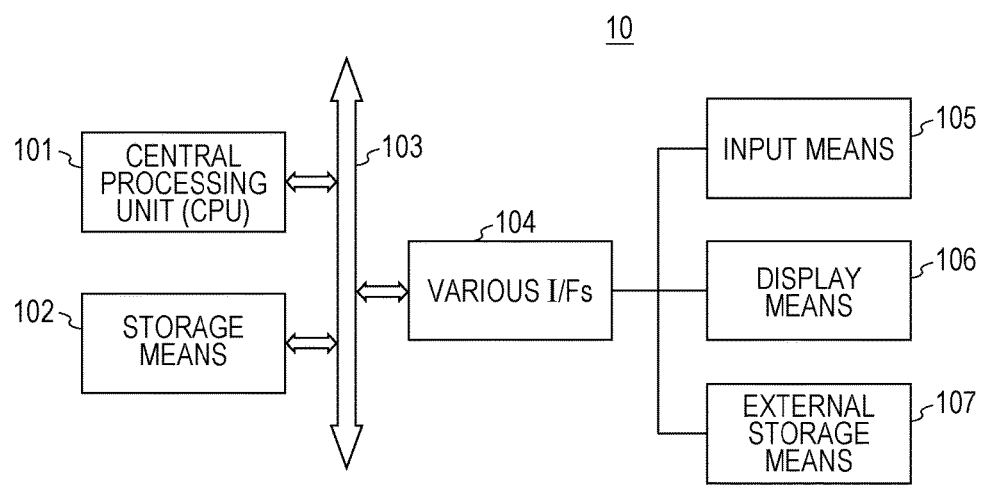
FIG. 2 is a diagram illustrating a configuration of a computer that performs embodiment of the present invention.

FIG. 2 is a diagram illustrating an example of a configuration of the server 10 in FIG. 1. The server 10 includes a central processing unit (CPU) 101, a storage means 102, and various I/Fs 104, which are connected to one another via a bus 103. The term "various I/Fs 104" is used as a generic term that includes an input I/F, an output I/F, an external storage I/F, an external communication I/F, and the like, and these I/Fs are respectively connected to an input means 105, such as a keyboard or a mouse, a display means 106, such as a CRT or an LCD, an external storage means 107, such as a USB-connected semiconductor memory or an HDD, and the like. The storage means 102 may include a semiconductor memory, such as a RAM or a ROM, an HDD, and the like. The method of the present invention is implemented by the server 10 loading and executing predetermined software stored in the storage means 102 or 107, for example.

The flow of the method of the present invention will be described with reference to the drawings. FIG. 3 is a flowchart illustrating a basic flow of the method of the present invention. In operation S11 in FIG. 3, an optimal route that connects a start point and an end point of a route input by a user is obtained. Information about the start point and the end point of the route is transmitted by the user from the terminal 20 to the server 10. The server 10 calculates an optimal route using any existing route finding algorithm on the basis of the received information.

A route described in the present invention including an optimal route is obtained as a graph (data structure) that includes a plurality of nodes and edges between two adjacent nodes. FIG. 4 illustrates an image of routes in an exemplary embodiment to which the present invention is applied. In FIG. 4, two routes which a vehicle 40 travels, that is, a route A represented by a continuous line and a route B represented by a dashed line, both of which extend from a start point S to an end point G, are illustrated. Note that in sections where both routes overlap (a section between S and P and a section between Q and G), the dashed line is hidden behind the continuous line and only the continuous line is visible. Referring to FIG. 4 to obtain an image, a plurality of nodes correspond to points (positions) represented by white circles 50, and edges between nodes correspond to lines 55. A node can be selected as the position of an intersection of roads, for example.

Next, in operation S12, the optimal route obtained in operation S11 is compared with a route history stored in a memory, and a route portion in the optimal route which is replaceable by a route portion in the route history is extracted. The route history stored in the memory includes routes which have been registered as favorites and which a user used at least several times in the past, for example. A route portion includes nodes (for example, the white circles 50 in FIG. 4), and edges (for example, the lines 55 in FIG. 4) which form part of the graph described above.

A replaceable route portion in an optimal route can be extracted as follows.

(a) Routes which a user has registered as favorites among routes communicated in the past remain stored and are compared with a route that is to be communicated to thereby extract a set α that includes known subgraphs covered by stored routes and a set β that includes unknown subgraphs. Note that, stored routes are given priority levels, and a subgraph belonging to the set α has accompanying information that indicates a stored route of the highest priority among stored routes by which the subgraph is covered.

(b) From successive subgraphs that belong to the set α extracted in the above process (a), all edges having the same accompanying information are rounded as one edge. To the rounded edge, accompanying information indicating a stored route of the highest priority is passed. Note that the processes (a) and (b) are performed on the basis of the route history of the server 10 (transmitting side), not on the basis of a route history of the terminal 20 (receiving side), which is a feature of the present invention.

Extraction of a route portion in operation S12 may include extraction of a route portion from the optimal route, this route portion overlapping a route portion in the route history. Here, overlapping means that routes overlap (are identical). In the example of routes in FIG. 4, the section between S and P and the section between Q and G in the route A and the route B include overlapping route portions, which corresponds to the above. Furthermore, in the case where a plurality of route portions in an optimal route are replaceable, it is possible to extract corresponding route portions from a plurality of route portions in the route history in descending order of the number of past extractions, for example.

Next, in operation S13, for the route portion extracted from the optimal route, route guidance is created using a text indication known to the user which specifies the replaceable route portion in the route history. Here, a text indication known to a user means a text indication such that the user can uniquely recognize a corresponding route when the user sees the text indication. For example, a route number, such as route 1, a well-known name including a street name, such as AAA street, a route which a user repeatedly travels, clearly remembers, and has registered as a favorite with a unique name, and a specific section of the route are text indications.

A known text indication is created for each of at least one edge that forms part of the graph described above, or is created as one text indication that corresponds to a plurality of (two or more) successive edges that form part of the graph. In the example of routes in FIG. 4, a known text indication is created for one edge 55 between two adjacent nodes, or two or more successive edges 55, for example.

In the creation described above, in the case where the rounded edge obtained in the above process (b) in operation S13 described above is used, a text for route guidance for the edge is created on the basis of the accompanying information about a stored route. For example, a text is created as follows.

"Go to intersection Y according to the registered route X"

or

"Go to destination W according to the registered route Z"

Next, in operation S14, a new text indication that specifies a route portion in the optimal route which is not replaceable by a route portion in the route history is used, and route guidance about the route portion that is not replaceable is created. A text indication is created for each of at least one edge that forms part of the graph described above, or is created as one text indication that corresponds to a plurality of (two or more) successive edges that form part of the graph similarly to operation S13. In the creation described here, for edges that belong to the set β that includes unknown subgraphs extracted in the above process (a) in operation S13 described above, a guidance text is created using a technique according to the related art employed in existing systems.

Next, in operation S15, the texts for route guidance created in operations S13 and S14 are concatenated and transmitted to the terminal 20 of the user as a single, optimal route guidance message. This transmission is performed via the network (communication path) 30 using SMS, for example. Next, in operation S16, the received optimal route guidance is displayed on the display screen 201 of the terminal 20. The optimal route guidance may be simultaneously communicated to the user from the terminal 20 by audio.

Exemplary Embodiment

Figure 5A:
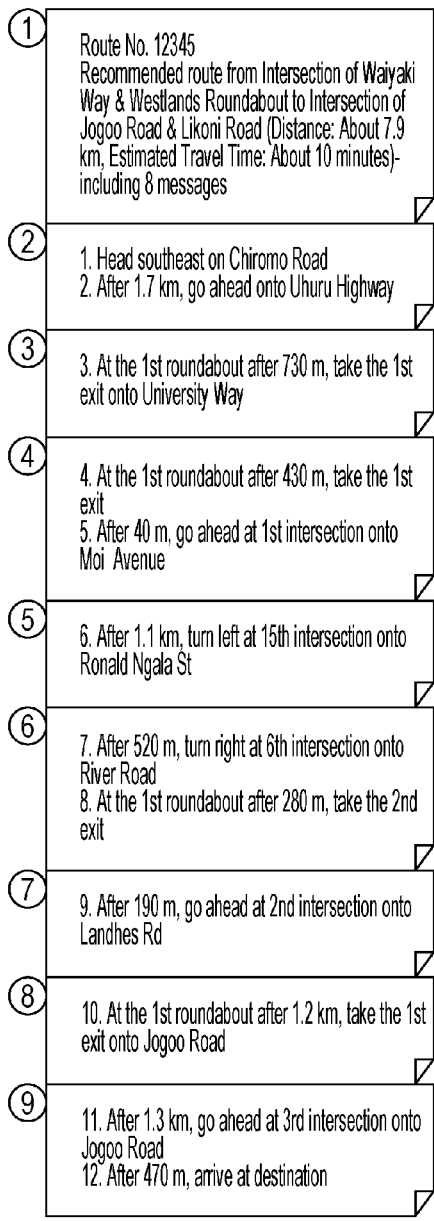
FIGS. 5(*a*) and 5(*b*) are diagrams illustrating route guidance in an exemplary embodiment of the present invention.
Figure 5B:
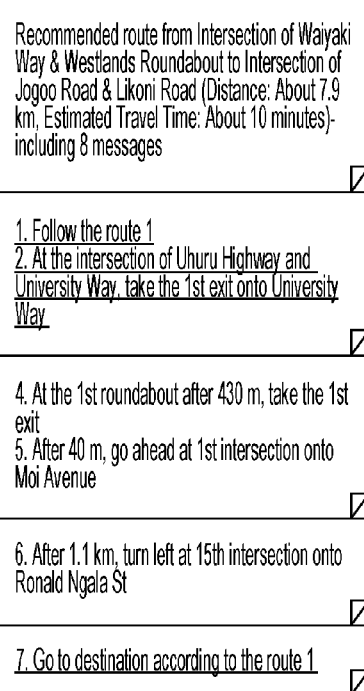

An exemplary embodiment of the present invention will be described with reference to FIG. 5. FIG. 5 is a diagram illustrating route guidance in an exemplary embodiment of the present invention. FIG. 5(*a*) illustrates texts for route guidance before application of the present invention, and FIG. 5(*b*) illustrates texts for route guidance after application of the present invention. When the texts before and after application are compared, it is found that the individual pieces of guidance (texts) labelled 2 and 3 in FIG. 5(*a*) are simplified into the guidance 2' in FIG. 5(*b*), and the individual pieces of guidance labelled 6 to 9 in FIG. 5(*a*) are simplified into the guidance 5' in FIG. 5(*b*). Such simplification can reduce the amount of data to be transmitted by the number of decreased characters. At the same time, a user can grasp the guided route (optimal route) more exactly and briefly. The simplification illustrated in FIG. 5(*b*) is specifically implemented by an algorithm described below, for example.

<Assumption>

(a) A set of routes registered by a user A is denoted by SR={$R_1, R_2, \ldots, R_a$}. It is assumed that $R_a$ indicates each route that the user A has registered as a favorite among routes shown by the system (server) to the user A. It is also assumed that the routes are sorted in accordance with the priority levels determined by the user A.

(b) Each route is represented as a set of pieces of basic information $R_aM_b$ for an SMS message, that is, $R_a$={$R_aM_1, R_aM_2, \ldots, R_aM_b$}, the pieces of basic information being listed in the order of guidance. $R_aM_b$ includes SI (an intersection that is the start point of the guidance), EI (an intersection that is the end point of the guidance), D (the distance between the start point and the end point), $EI_d$ (description of EI), $EI_a$ (an action to be taken at EI), and $EI_r$ (the name of a route to be taken at EI).

(c) A new route NR is also represented as a set of pieces of basic information $NRM_c$ for an SMS message, that is, NR={$NRM_1, NRM_2, \ldots, NRM_c$}.

<Algorithm>

(1) i is set to 1, and m is set to $NRM_i$ (that is, i=1 and m=$NRM_i$).

(2) $R_a$ that is given the highest priority and that includes part of or matches the longest series of successive L items, that is, [$NRM_i, \ldots, NRM_{i+L-1}$], is selected as $R_x$, the L items being successive and starting with m, L exceeding a predetermined threshold X. The matched portion of $R_x$ is represented by [$R_xM_y, \ldots, R_xM_{y+L-1}$]. If a corresponding $R_a$ does not exist, in the case of i=k-1, the processing ends. Otherwise, i is incremented by 1 and m is set to $NRM_i$ (that is, i=i+1 and m=$NRM_i$), and the process (2) is repeated.

(3) In the case of i=1 and L=k, this means NR∈$R_a$. Therefore, replacement by the following message is performed, and the processing proceeds to the process (6) below.

"Go to destination according to the route $R_a$"

(4) $NRM_i$ is compared with $R_xM_y$. If $NRM_i$ includes a route that is not covered by $R_xM_y$, a route from $NRM_i$(SI) to $R_xM_y$(SI) is created. However, if $NRM_i$ is entirely covered by $R_xM_y$, a route is not created here. Then, a route that is to travel is generated in accordance with $R_x$. Furthermore, $NRM_{i+L-1}$ is compared with $R_xM_{y+L-1}$. If $NRM_{i+L-1}$ includes a route that is not covered by $R_xM_{y+L-1}$, a route from $R_xM_{y+L-1}$(EI) to $NRM_i$(EI) is also generated. However, if $NRM_{i+L-1}$ is entirely covered by $R_xM_{y+L-1}$, a route is not created here. In this case, a route that is finally generated is as follows.

"at RxMy(SI) after D' (=distance from $NRM_i$(SI) to $R_xM_y$(SI), follow the route $R_x$", or simply "follow the route Rx"

("at $R_xM_{y+L-1}$(EI), $NRM_i(EI_a)$ onto $NRM_i(EI_r)$")

(5) However, if i=k-L-1 is satisfied and $NRM'_{i+L-1}$ is covered by $R_xM_{y+L-1}$ in the process (4), arrival to the destination can be attained with the route. Therefore, the last route is created by replacement by the following message.

"Go to destination according to the route $R_x$"

(6) i is incremented by L (that is, i=i+L).

In the case of i>k-x, the processing ends. Otherwise, m is set to $NRM_i$ (that is, m=$NRM_i$), and the processing returns to the process (2) above.

While an embodiment of the present invention has been described with reference to the drawings, the present invention is not limited to the embodiment. The present invention may be implemented while making various improvements, modifications, or alterations on the embodiment on the basis of the knowledge of those skilled in the art without departing from the spirit of the present invention.

REFERENCE SIGNS LIST

10: server
20: terminal
30: network (communication path)
40: vehicle
50: node
55: edge
100: network system
201: display screen

The invention claimed is:

1. A computer implemented method for performing route guidance using text, the method comprising:

obtaining an optimal route that connects a start point and an end point of a route input by a user;

creating a route guidance for the optimal route comprising one or more new text indications that specify directions along the optimal route;

identifying one or more preferred routes along the optimal route from a route history stored in a memory, wherein the one or more preferred routes are routes indicated by the user as being a favorite route, and wherein the one or more preferred routes includes a user-created label for at least one of the one or more preferred routes;

creating a preferred route guidance for the one or more preferred routes comprising one or more known text indications that specify directions along the one or more preferred routes, wherein the preferred route guidance includes one or more text indications for alternate routes that connects the start point and the end point of the route input by the user;

comparing the route guidance for the optimal route with the preferred route guidance for the one or more preferred routes;

creating a consolidated route guidance by replacing a subset of the one or more new text indications with the one or more known text indications based upon the comparison of the route guidance for the optimal route with the preferred route guidance for the one or more preferred routes, wherein the one or more known text indications utilize fewer characters of text than the one or more new text indications, and wherein the creating the consolidated route guidance includes the user-created label for at least one of the one or more preferred routes;

transmitting the consolidated route guidance to a terminal operable by the user, wherein the terminal includes a display screen operable to display the consolidated route guidance.

2. The method of claim 1, wherein the optimal route and the route history are each obtained as a graph that includes a plurality of nodes and edges between two adjacent nodes, and a route portion in the route history and a route portion in the optimal route each include the nodes and the edges that form part of the graph.

3. The method of claim 2, wherein the one or more known text indications and the one or more new text indications are created for each of at least one edge that forms part of the graph.

4. The method of claim 2, wherein the one or more known text indications and the one or more new text indications are created as one text indication that corresponds to a plurality of successive edges that form part of the graph.

5. The method of claim 1, wherein the replacing the subset of the one or more new text indications includes replacing with the one or more known text indications in descending order of the number of past replacements.

6. The method of claim 1, wherein the replacing the subset of the one or more new text indications includes replacing the subset of the one or more new text indications, the subset of the one or more new text indications overlapping the one or more known text indications in the route history.

7. The method of claim 1, wherein creating the consolidated route guidance includes creating known route guidance so as to enable the user to uniquely recognize the one or more known routes specified by the one or more known text indication.

8. The method of claim 1, wherein the consolidated route guidance is a route guidance for car navigation, and the start point and the end point are a place of departure and a destination of a travel route respectively.

* * * * *